United States Patent [19]
Dunne

[11] Patent Number: 5,715,045
[45] Date of Patent: Feb. 3, 1998

[54] COUNTERMEASURE DETECTING CIRCUIT, AND ASSOCIATED METHOD, FOR A LASER SPEED DETECTING APPARATUS

[75] Inventor: Jeremy G. Dunne, Littleton, Colo.

[73] Assignee: Laser Technology, Inc., Englewood, Colo.

[21] Appl. No.: 648,369

[22] Filed: May 15, 1996

[51] Int. Cl.⁶ ................. G01P 3/36; G01S 7/36
[52] U.S. Cl. ..................... 356/28; 342/16
[58] Field of Search .......... 356/28, 28.5; 342/16, 342/17, 19

[56] References Cited

U.S. PATENT DOCUMENTS 5,173,701  12/1992  Dijkstra ..................... 342/17
5,221,956  6/1993  Patterson et al. ............ 356/28
5,359,404  10/1994  Dunne ........................ 356/5

*Primary Examiner*—Mark Hellner
*Attorney, Agent, or Firm*—William J. Kubida; Holland & Hart LLP

[57] ABSTRACT

A countermeasure-detecting circuit, and associated method, for a laser speed detector. Countermeasures taken at a moving target, such as a vehicle, to interfere with operation of the laser speed detector are detected. When countermeasures taken at the moving target are detected, the sensitivity of the laser speed detector is altered to overcome the effects of the countermeasures.

21 Claims, 5 Drawing Sheets

COUNTERMEASURE DETECTING CIRCUIT, AND ASSOCIATED METHOD, FOR A LASER SPEED DETECTING APPARATUS

BACKGROUND OF THE INVENTION

1. Field of the Invention

The invention relates generally to speed detection apparatus that transmits light energy to a moving target and detects reflection of light energy from the target to determine the speed of the target. More particularly, the invention relates to a circuit, and an associated method, which detects countermeasures taken at the target to attempt to impede such speed detecting apparatus from properly detecting the speed of the target.

2. Background Information

Countermeasures taken at a moving vehicle to impede detection of the speed of the vehicle by laser speed detecting apparatus operated by police, or other traffic enforcement officials are detected through operation of the invention. Once detected, adjustments can be made by the detecting apparatus to counteract for the countermeasures or provide an indication that the countermeasures taken by the moving vehicle prevent an accurate determination of the speed of the vehicle.

State motor vehicle codes regulate the operation of vehicles on public roadways. The provisions of the motor vehicle codes are enforced by police, or other traffic enforcement officials to ensure compliance with the motor vehicle codes. For instance, most motor vehicle codes include provisions defining maximum speed limits at which vehicles can be operated on public roadways. To enforce such provisions of the motor vehicle codes, the speeds at which the vehicles are traveling must be accurately detected.

Most simply, a policeman can follow the vehicle and detect its speed by determining the speed at which the policeman must travel to follow the vehicle. Radar-type speed detectors are often used to detect the speed at which a vehicle is traveling. Such detectors generate high frequency electromagnetic energy transmitted to, and reflected from, the vehicle. Energy reflected from the vehicle is detected by the device and the speed of the vehicle is determined.

Electromagnetic energy generated and transmitted by conventional radar-type speed detectors exhibits significant divergence, however. Because it is so divergent, the signals transmitted by a conventional radar-type detector can be detected at a vehicle well beyond a typical measuring range in which the detector can be used to determine the speed the vehicle. Thus, an operator of a vehicle can install an apparatus on the vehicle that can detect the signals generated by the conventional, radar-type speed detector. Detection of the generated signals by such a device provides the operator of the vehicle with advanced warning that speed enforcement operations are being undertaken before the vehicle travels into the measurement range of the detector. Because the operator of the vehicle can detect the use of a radar detector before the speed of the vehicle can be determined, the operator can slow down until the vehicle is out of the measuring range of the radar speed detector. The operator, therefore, can easily evade the police enforcement actions.

U.S. Pat. No. 5,359,404, assigned to the assignee of the present invention, shows a laser-speed detector that can determine the speed of a moving vehicle or other target. The speed determination is made by targeting the vehicle, transmitting a series of laser pulses to it, and detecting reflections of the pulses from it. In response to the pulses reflected by the vehicle and detected by the speed detector, the speed of the vehicle is determined.

To avoid some oft he problems associated with radar speed detectors, speed detectors that use laser light have been proposed. Laser light is highly directional and generates little divergence, particularly in contrast to the electromagnetic energy generated by conventional, radar speed detectors. Because the light energy generated by a laser speed detecting device exhibits little divergence, light energy cannot easily be detected before a vehicle comes within the measuring range of the laser speed detector. Therefore, when a laser speed detector is used, an operator of a vehicle is unable to defeat enforcement operations by temporarily changing his speed.

Although the light energy generated by laser speed detectors cannot be readily detected beyond the measuring range within which the laser speed detector operates, countermeasures have been attempted to interfere with the operation of such laser speed detectors.

Such countermeasures have typically involved the installation of high-intensity, light generators on the vehicles. The light generator is selected to generate light of wave lengths corresponding to the wave lengths of the light transmitted by the laser speed detector. Because the laser speed detector operates in response to detection of pulses of laser light energy reflected from a target vehicle, installation of a light-generating device on the vehicle makes the detection of the reflected light energy pulses difficult.

The light generator on the vehicle generates light energy that effectively forms a high level of background noise. The laser speed detector detects both the light energy generated at the vehicle and the reflected light energy pulses from the vehicle. The light energy forming the background noise must be distinguished from the reflected pulses. When the background noise is of a high level, distinguishing the reflected pulses is difficult.

SUMMARY OF THE INVENTION

The invention, accordingly, advantageously provides circuitry that can detect when attempts are made to evade speed detection by a laser speed detector.

The invention further advantageously provides a laser speed detector that includes circuitry to detect when attempts are made to evade speed detection by a laser speed detector.

By indicating to the police that a vehicle is transmitting high-intensity light energy, the officers can deduce that the operator of the vehicle is likely attempting to evade speed detection. Such an indication would also provide the officer with an identifiable error message if the light energy generated at the vehicle is of great enough amplitude to prevent accurate speed determination. Such an indication would also allow the sensitivity of the laser speed detector to be altered to ignore the high-intensity light energy.

According to the invention, therefore, a countermeasure detecting circuit and an associated method detect countermeasures taken at a target to impede speed measurements taken with a laser speed detector. The laser speed detector is operative to transmit light energy to the target and to receive light energy reflected from the target. Light signal detecting circuitry detects light energy of wave lengths corresponding to wave lengths of the light energy transmitted by the laser speed detector. Received-light signals of values representative of the levels of light energy of the selected wave lengths are further generated. A comparator circuit is coupled to receive the received light signals generated by the light signal detecting circuitry. The comparator circuit compares the values of the received light signals with a threshold signal. The threshold signal is of values representative of levels of background noise of light energy typically received by the light signal detecting circuitry. Comparison signals are generated responsive to such comparisons. The comparison signals are of values representative of times in which the light energy detected by the light signal detecting circuitry exceeds levels of background noise by at least a selected amount. Control circuitry is coupled to receive the comparison signals generated by the comparator circuit. The control circuitry detects when the comparison signals are of values indicative of countermeasures taken at the target.

An appreciation of the invention and its scope can be obtained from the accompanying drawings, which are briefly summarized below, the following detailed description of the presently preferred embodiments of the invention, and the appended claims.

BRIEF DESCRIPTION OF THE DRAWINGS

The invention is illustrated in the accompanying drawings, in which.

In the various figures of the drawings, like reference numerals are used to denote like or similar parts.

DETAILED DESCRIPTION OF THE PREFERRED EMBODIMENTS

Figure 1:
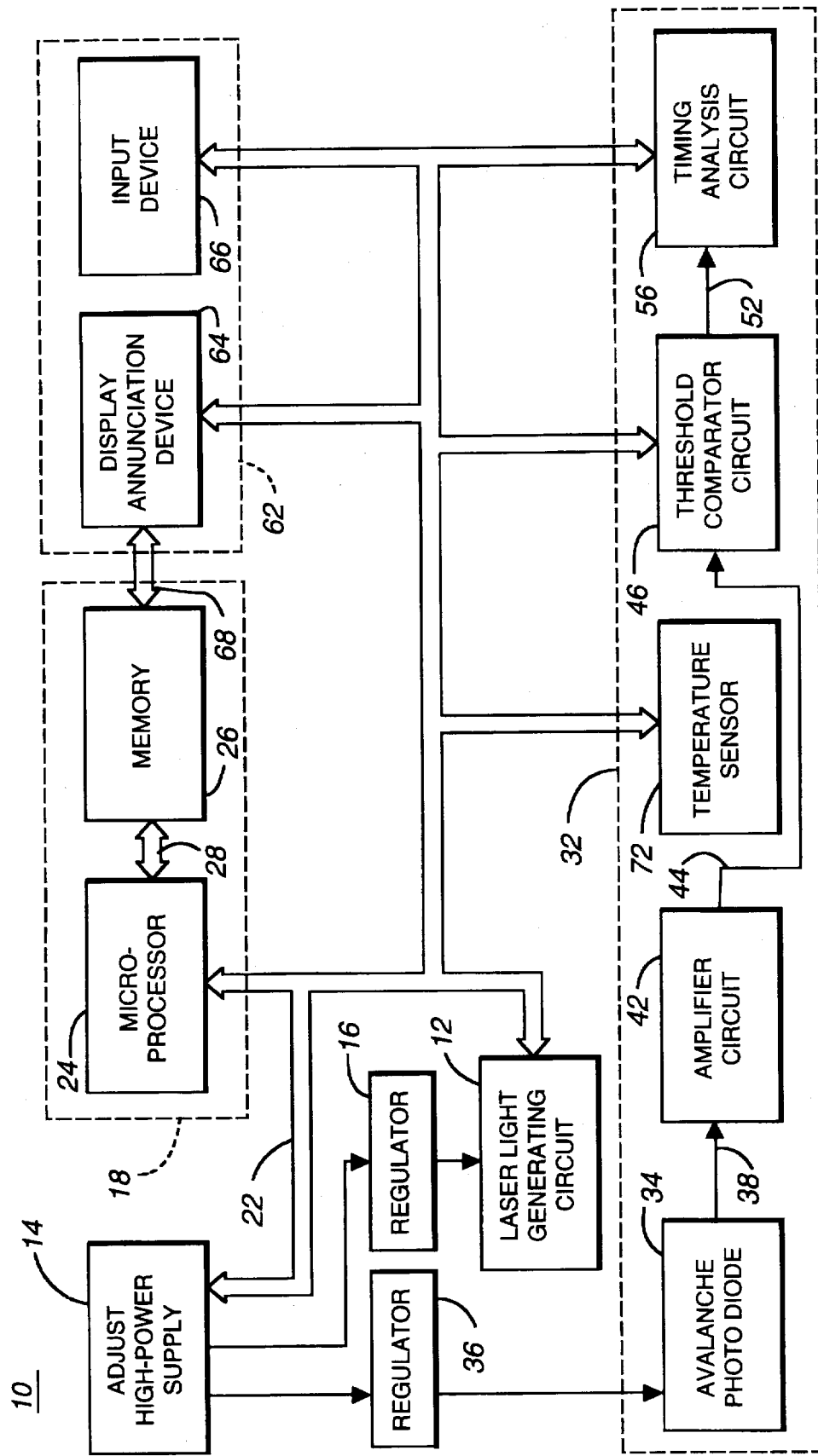
FIG. 1 is a functional block diagram of a laser speed detector including the circuitry according to a preferred embodiment of the invention.

Referring first to FIG. 1, a laser speed detector 10 operative to detect the speed of a moving target, such as a moving vehicle, is shown. The detector 10 is operative to generate and transmit laser light energy pulses, which are directed toward the target. Laser light striking the target and reflected back to the detector 10 is detected at the detector, and, responsive to such detected reflections, the speed of the target is determined. Portions of the circuitry of the detector 10 may be constructed similarly to the laser-based speed detector shown in U.S. Pat. No. 5,359,404, assigned to the assignee of the present invention and incorporated herein by reference.

The laser speed detector 10 includes a laser light generator 12 powered by an adjustable, high-voltage power supply 14 by a regulator 16. The regulator 16 regulates the level of power applied to the laser light generator 12 to cause the laser light generator 12 to generate pulses of laser light. The circuit 12 further includes a laser light beam collimator and circuitry to cause the generation of the laser light, as desired (not shown in FIG. 1). Further details of the laser light generator 12 are shown in U.S. Pat. No. 5,359,404.

The laser light generator 12 and the adjustable, high voltage power supply 14 are coupled to processing circuitry 18 by a bus 22. The processing circuitry 18 includes a microprocessor 24 and a memory device 26, coupled by an internal bus 28. The operation of the processing circuitry 18 controls the operation of the power supply 14 and the laser light generator 12. Further details of operation of the processing circuitry 18 are shown in U.S. Pat. No. 5,359,404.

The laser speed detector 10 further includes receiving circuitry for receiving light of frequencies corresponding to the frequencies of the laser light generated by the laser light generator 12. A laser light receiving circuit 32 includes an avalanche photodiode having electrical characteristics that change in response to the detection of light energy of selected wavelengths.

Using an appropriate narrow band interference filter with the avalanche photodiode 34, the electrical characteristics of the photodiode change in response to reception of light energy of frequencies corresponding to the frequencies of the laser light generated by the laser light generator 12. The photodiode 34 is powered by the adjustable, high voltage power supply 14 by a regulator 36. Depending upon the voltage level of the power generated by the power supply 14 and regulated by the regulator 36, the photodiode 34 generates a signal on the line 36 when light energy of the selected wave lengths of amplitudes greater than a selected level is received by the photodiode. Because the laser light generated by the laser light generator 12 is formed of a series of light pulses, when the photodiode 34 receives reflections of the laser light pulses, the photodiode 34 generates pulsed signals on the line 38. The signals generated on the line 38 are amplified by an amplifier circuit 42, which generates amplified signals on the line 44. The line 44 is coupled to an input of a threshold comparator circuit 46.

The threshold comparator circuit 46 compares the level of the amplified signal applied to it on the line 44 to a threshold value, and to generate a signal on the line 52 when the signal generated on the line 44 is greater than the threshold Value. The threshold comparator circuit 46 is coupled to the bus 22 and, therefore, the processing circuitry 18. In one embodiment of the invention, the processing circuitry 18 controls the level of the value of the threshold against which the comparator circuit 46 compares the signal generated on the line 44.

Since the reflections of the laser light energy received by the photodiode 34, amplified by the amplifier circuit 42 and compared by the comparator circuit 46, are formed of pulses, the signals generated on the line 52 form square waves. The line 52 is coupled to timing analysis circuitry 56, which receives the square wave pulses generated by the comparator circuit 46 when the amplified signals 44 are greater than the threshold value used by the comparator circuit 46.

The timing analysis circuit 56 is coupled to the bus 22 and, therefore, also the processing circuitry 18. Further details of the timing analysis circuitry are described in U.S. Pat. No. 5,359,404. Operation of the processing circuitry 18, responsive to generation of the pulses of laser light energy and detection of the laser light pulses reflected back to the detector 10, determines the speed of the target.

The laser light detector 10 includes an input/output device 62, which includes a display annunciator 64 and an input device 66. Both devices 64 and 66 are coupled to the bus 22. The display annunciator 64 is further coupled to the memory element 26 by a bus 68. The elements of the input/output device 62 allow the input of operating, and other, commands to select the operation of the laser speed detector and to display speed measurements determined during operation of the detector 10. When a determined speed of a target is greater than a permissible level, for instance, the display annunciator 64 may further generate an audio alarm indicative of such determination.

As the characteristics of the avalanche photodiode 34 are further dependent upon temperature, the laser speed detector further includes a temperature sensor 72 operative to detect temperature levels proximate to the photodiode 34. The temperature sensor 72 is coupled to the bus 22 and, therefore, also to the processing circuitry 18. Responsive to the temperature levels sensed by the temperature sensor 72, the processing circuitry 18 causes the voltage levels of the power supplied by the power supply 14 to the photodiode 34 to be altered, as necessary. By adjusting the voltage levels of the power applied to power the photodiode 34, the effects of temperature upon the operating characteristics of the photodiode 34 can be counteracted.

Similarly, background noise of light energy of frequencies corresponding to the frequencies of the pulses of laser light energy transmitted to and reflected back from a target can also be counteracted. As the noise is non-determinative and can be represented by "white noise" levels, the sensitivity of the photodiode 34 can be adjusted by adjusting the levels of the voltage of the power applied to the photodiode. That is to say, by decreasing the levels of the voltage of the power applied to the photodiode, the levels of light energy received by the photodiode 34 must be greater to cause the characteristics of the photodiode to generate signals on the line 38. In this manner, the sensitivity of the photodiode 34 is effectively altered to ignore levels of background noise.

As mentioned, attempts have been made to interfere with speed detection using a laser speed detector, such as the device 10. A laser speed detector is perhaps most frequently utilized in enforcement operations by police, or other traffic enforcement officials to enforce the speed provisions of motor vehicle codes. Attempts have been made by operators of vehicles to evade speed detection of the speed at which their vehicles are traveling by laser speed detectors.

Such attempts, as also mentioned, involve the positioning of light-generating devices upon the vehicle. The light-generating devices generate light energy of frequencies corresponding to the frequencies at which laser speed detectors are operable. Generation of high-intensity light energy by the light-generating devices is intended to prevent the laser speed detector from distinguishing between the reflected pulses of laser light generated by the laser speed detector and the light energy generated at the vehicle.

The laser speed detector 10 is further operative to detect when attempts to evade speed detection are made. Such determinations are annunciated by the annunciator 64. Police, or other traffic enforcement officials using the device 10 in traffic enforcement operations are provided with an indication of vehicles which might be operated by operators attempting to evade speed detection. Times in which the light energy generated at the vehicle is so significant to prevent an accurate determination of the speed at which the vehicle is traveling can also be annunciated to provide the police, or other traffic enforcement officials, with an indication that the speed determined by the laser speed detector 10 is likely not to be accurate. Further, by determining such times in which light energy is generated at the vehicle, the sensitivity of the receiving circuit 32 can be adjusted to attempt to counteract for the reception of such light energy.

The light energy generated by the light-generating devices positioned at the vehicle forms background noise. The receiving circuit 32 of the laser speed detector 10 must distinguish the background noise from the reflections of the laser light pulses reflected back to the detector. The sensitivity of the receiving circuit 32 is adjusted to counteract for such noise.

As the light energy of the light-generating device generates light energy of greater levels than the background noise levels normally received by the receiving circuit, a high-level of background noise is detected by the processing circuitry 18, and annunciated by the annunciator 64. If the sensitivity of the receiving circuit 32 can further be adjusted to counteract for the high levels of background noise, the speed of the vehicle may still be determined and displayed.

As described in detail below, in one embodiment of the invention, the voltage level of the power applied to the photodiode 34 is altered to counteract for the high levels of background noise. In another embodiment, the threshold level used by the threshold comparator circuit 46 is altered, also to counteract for the high levels of background noise.

Figure 2:
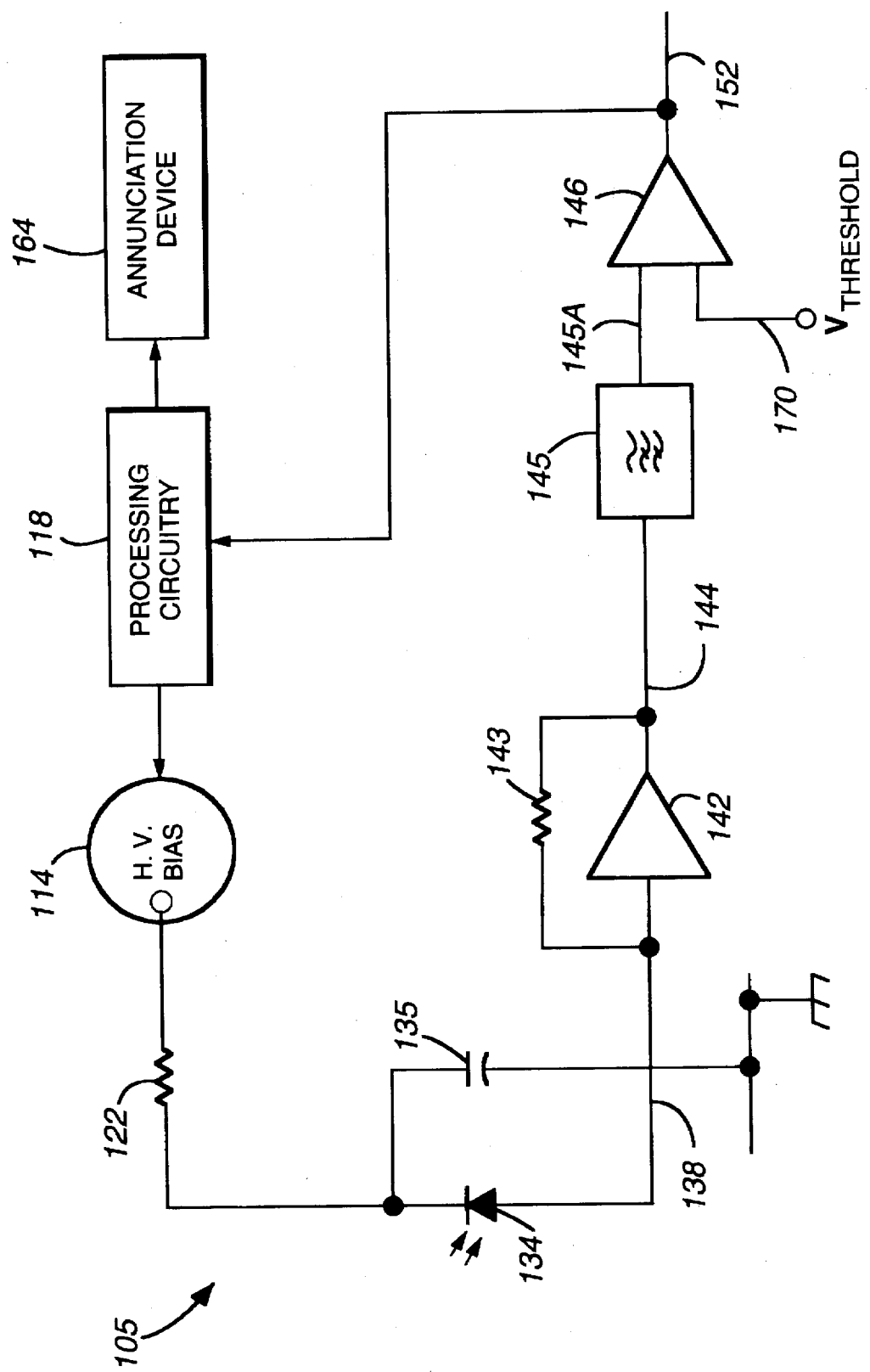
FIG. 2 is a functional block diagram of a circuit for use in the laser speed detector of FIG. 1, for detecting and overcoming attempts to prevent speed determination, according to a preferred embodiment of the invention.

FIG. 2 illustrates a circuit, shown generally at 105, of an embodiment of the invention. Certain of the elements of the circuit 105 form portions of various of the elements of the laser speed detector 10 shown in functional block one in FIG. 1. When the circuit 105 forms part of a laser speed detector, such as the device 10 shown in FIG. 1, times in which light energy received at the circuit 105 is of levels indicative of an attempt to prevent determination of the speed of a moving target can be determined. When it is determined that an attempt has been made at a target to prevent the laser speed detector from determining the speed of the target, the circuit 105 overcomes the attempt.

The circuit 105 includes an adjustable, high-voltage power supply or bias circuit 114. The voltage level of power generated by the power supply 114 is controlled by signals generated by processing circuitry 118. The power supply 114 is coupled through a resistor 122 to a first side of an avalanche photodiode 134. A shunt capacitor 135 is coupled between the first side of the photodiode 134 and ground. A second side of the photodiode 134 is coupled, by line 138, to an input of an amplifier circuit 142.

A resistor 143 is coupled across an input and output side, respectively, of the amplifier 142. The output of the amplifier 142 is coupled by line 144 to an input of a filter 145, and an output of the filter 145 is coupled by the line 145A to an input of a comparator 146. A threshold signal is applied to a second input of the comparator 146. An output of the comparator 146 is coupled to the processing circuitry 118.

The electrical characteristics of the photodiode 134 are altered in response to reception of light energy of selected wave lengths. When reflections of pulses of laser light energy impinge upon the photodiode 134, signals representative of the pulses are generated on the line 138 and applied to the input of the amplifier 142. The amplifier 142 amplifies the amplified signal, the amplified signal is filtered, and the amplified, filtered signal is applied to an input of the comparator 146.

The level of the signal applied to the comparator 146 is compared with a threshold voltage level. When the voltage level of the amplified, filtered signal is greater than the threshold voltage level, the comparator 146 generates an output signal on line 152. Signals representative of the values of the signals generated on the line 152 are provided to the processing circuitry 118. Responsive to the levels of the signals on line 152, the processing circuitry 118 causes alteration of the voltage levels of the power supply 114 and, if appropriate, actuation of the annunciator 164.

Figure 3A:
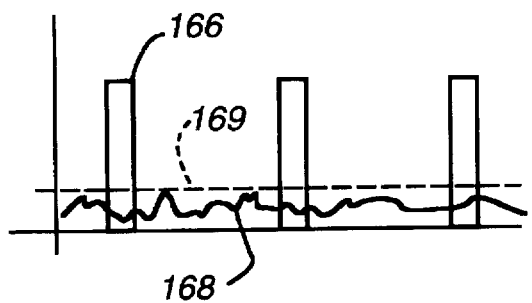
FIGS. 3A-3F are graphical representations illustrating signals generated during operation of the circuit shown in FIG. 2.

The alteration of threshold voltage levels and the actuation of the annunciator 164 by processing circuitry 118 proceeds as illustrated in FIGS. 3A–3F. With reference first to FIG. 3A, a signal 166 is shown which represents that which would be generated on line 145A by a reflected laser light pulse. Also shown in FIG. 3A is a signal 168 which represents the background noise associated with that return pulse which would be received simultaneously with that pulse and be present on line 145A.

Figure 3B:
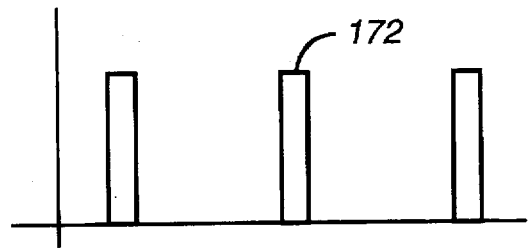

The threshold voltage level established by processor 118 for controlling the voltage of the voltage generator 115 and used for purposes of establishing a biasing voltage for avalanche photodiode 134 is shown in FIG. 3A as a primary threshold 169. With the comparator set at this primary threshold level, the resultant signal generated at comparator 146 is shown in FIG. 3B as signal 172. Using this comparator signal 172, processing circuitry 118 may reliably execute a speed calculation in the presence of a small amount of "white noise," or the like. If the threshold level is insufficient to eliminate most of the background noise represented by signal 168, then the speed calculation made by processing circuitry will be determined by circuit 118 to have a low degree of reliability and will not be used. An error indication will then be sent to the annunciator 164 and the threshold will be increased.

Alternately, if the comparator signal 172 present on line 152 resembles that shown in FIG. 3B, specifically a clean square wave of relatively stable frequency, then the processing circuitry 118 will make a speed calculation for the target vehicle and will determine that calculation has a high degree of reliability due to the absence of noise. The processing circuit will then send the results of the speed calculation to annunciator 164.

Figure 3C:
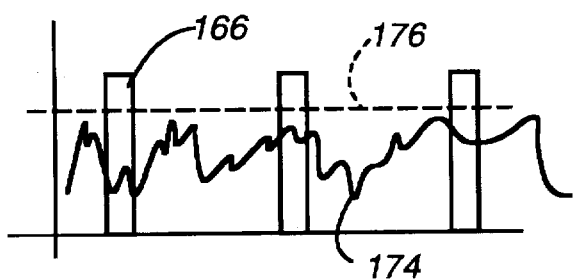
Figure 3D:
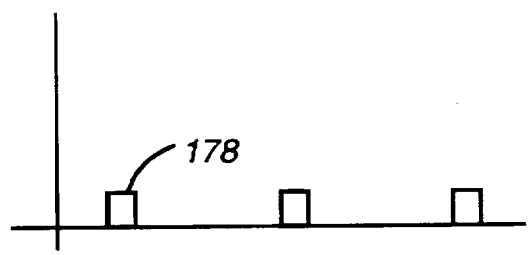

With reference now to FIG. 3C, the signal 166 shown represents the reflected laser light pulse received at photodiode 134, which is produced on line 145A. A background noise signal that may be produced, for example, by a bright light source. Such bright light may be broadcast, for example, by a bright light from the targeted vehicle, perhaps with the intent of jamming the pulse signal by increasing the level of background noise received by photodiode 134 and therefore disrupt the speed calculation of processing circuit 118. When this signal 174 along with signal 168 and reflected signal 166 is received by avalanche photodiode 134, the resultant signal from comparator 146 on signal line 152 ordinarily would not have a stable frequency, indicating a failure to filter out signals 168 and 174, resulting in the processor 118 being unable to make a reliable speed determination at the primary threshold level.

According to the invention, however, in response to a signal combination such as that illustrated in FIG. 3C, the processing circuit 118 lowers biasing voltage on line 170 to the avalanche photodiode 134, effectively raising the threshold of comparison from the primary threshold 170 to a secondary threshold 176, shown in FIG. 3C. Because of this higher threshold, the bias on the photodiode 134 is adjusted. The output from the comparator 146 therefore produces a set of pulses 178, shown in FIG. 3D, having a stable frequency, resulting from the presence of less noise in the signal output from comparator 146. The set of pulses 178 can be decoded in the manner above described.

Figure 3E:
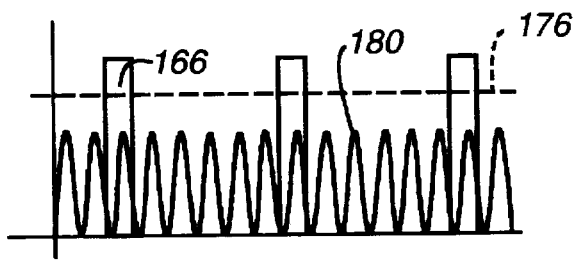

With reference next to FIG. 3E, another jamming technique is illustrated in which a jamming signal is broadcast at the target vehicle. This results in the reflected pulse signal 166 from the target vehicle signal being produced at the output of the comparator 146, along with a periodic signal 180 produced by the jamming signal. The periodic signal may be, for instance, in the frequency range centered on 10 Megahertz.

Figure 3F:
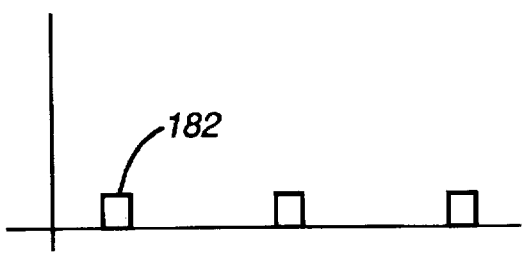

To discriminate the reflected light signal 166 from the periodic signal 180, the processor 118 lowers the biasing voltage of avalanche photodiode 134 to a secondary jamming threshold level 176 as indicated above. The resultant square wave present on the output of comparator 146 is shown in FIG. 3F as a signal 182 which is the signal output by comparator 146. When signal 182 is passed on signal line 152 to processing circuitry 118, a speed calculation may be reliably done. If, as mentioned above, noise levels on the comparator output signal have been reduced sufficiently through use of secondary threshold level 176 then processing circuitry 118 will accord a high reliability to the speed calculations it does. Under these conditions an indication of speed and of jamming will be sent from processing circuit 118 to annunciator 164. Such information may be useful to police in states where jamming of police speed indication devices is prohibited.

If, as discussed above, a jamming signal similar to either pulsed signal 180 or bright light signal 174 is received by photodiode 134 and has an amplitude greater than that shown on FIGS. 3C and 3E, then the processing circuitry 118 will be unable to obtain a signal lock, will be unable to obtain a speed calculation having a high reliability and will under those circumstances pass to annunciator 164 an indication of error with respect to the speed calculation and an indication of jamming as the cause of that error at which point the police, depending on state law, may act appropriately.

Therefore, by an adjustment of the threshold levels necessary to separate background and/or jamming noise from the reflected laser signal, processing circuitry 118 can, not only determine the speed of the targeted vehicle, but also detect whether that particular vehicle is using jamming techniques.

Figure 4:
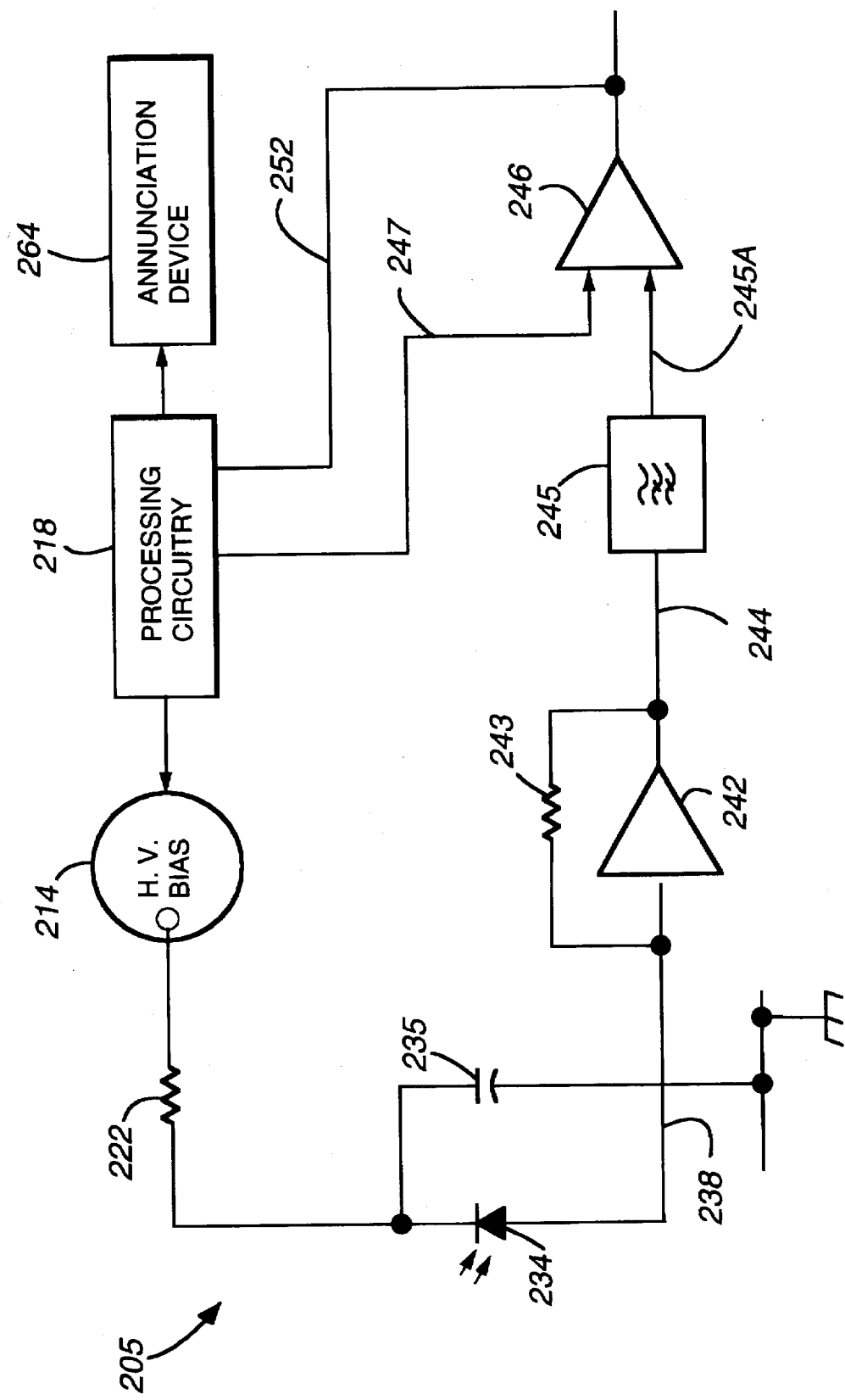
FIG. 4 is a partial circuit schematic, partial functional block diagram, similar to that shown in FIG. 2, of an alternate embodiment of the circuit of the invention.

FIG. 4 illustrates a circuit, shown generally at 205, of an alternate embodiment that may be incorporated to form part of a laser speed detector, such as the device 10 shown in FIG. 1. The circuit 205 is similar to the circuit 105 shown in FIG. 2 and includes a power supply 214. The power supply 214 differs with the power supply 114 in that the power supply here need not be an adjustable power supply. Also, the processing circuitry 218 in this embodiment need not be used to adjust the voltage levels of the power supply 214. The power supply 214 is coupled through resistor 222 to a first side of an avalanche photodiode 234. A shunt capacitor 235 is coupled between the first side of the photodiode 234 and ground.

A second side of the photodiode 234 is coupled by the line 238 to an input of an amplifier 242. A resistor 243 is coupled across opposing sides of the amplifier 242. The output of the amplifier 242 is coupled by the line 244 to an input of a filter 245, and an output of the filter 245 is coupled by the line 245A to a first input of a comparator 246.

A threshold signal is applied by a line 247 to a second input of the comparator 246. The line 247 is coupled to the processing circuitry 218, and the processing circuitry 218 is operative to control the level of the threshold signal. Signals representative of the signals generated by the comparator 246 are applied to the processing circuitry, here on line 252.

In this embodiment, in contrast to the circuit 105 shown in FIG. 2, the voltage level of the power applied to the photodiode is not altered. Instead, the value of the threshold signal applied to an input of the comparator 246 is altered.

By appropriate selection of the value of the threshold signal, the selectivity of the circuit 205 can be adjusted to overcome the effects of background noise.

The performance of the system shown in FIG. 4 is in many respects similar to that of the circuit shown in FIG. 2. The processing circuitry 218 makes speed, reliability, and jamming determinations similarly to processing circuitry 118. Threshold levels are altered from a primary to a secondary level based on the same considerations as discussed above in connection with the circuit shown in FIG. 2. Signal processing of the signal received on comparator line 252 is identical to that shown in FIGS. 3A-F.

The distinction between the circuits of FIG. 2 and FIG. 4 lies in the manner of adjusting for a primary and a secondary threshold. As stated above, the method for adjusting the threshold level in the circuit shown in FIG. 4 is based on an alteration of the threshold 247 of the comparator 246. Also, the method for adjusting the threshold level in the circuit shown in FIG. 2 is based on the alteration of the biasing voltage 114 applied to the avalanche photodiode 134.

To allow further alteration of the sensitivity of a laser speed detector, the laser speed detector may be constructed to allow not only the voltage levels of the adjustable power supply to be altered, as shown in the embodiment illustrated in FIG. 2, but also to allow alteration of the level of the threshold signal applied to a comparator circuit as shown in the embodiment illustrated in FIG. 4.

Use of the circuit 105 or 205, or a combination of both, to form part of a laser speed detector, such as the device 10 shown in FIG. 1, overcomes attempts taken to prevent speed detection of a moving target. When high levels of background noise are detected, the sensitivity of the receiver circuitry portion of the laser speed detector is altered to counteract the attempts to impede the speed detection. When such attempts are detected, the laser speed detector incorporating the circuit 105 or 205 can annunciate such indication and, if the countermeasures are significant enough to prevent accurate speed determination of the moving target, an error message will be provided to the operator.

Figure 5:
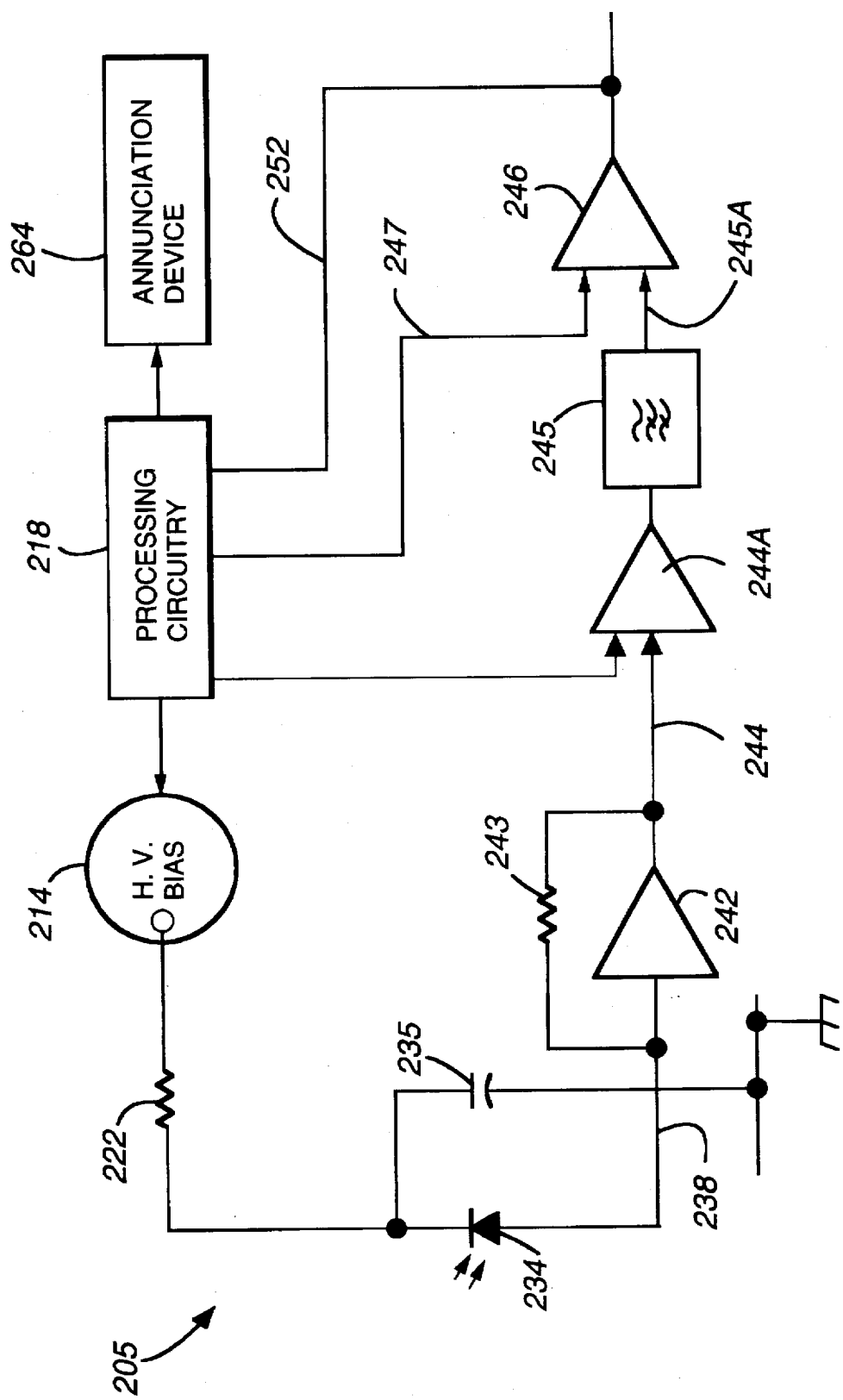
FIG. 5 is a partial circuit schematic, partial functional block diagram, similar to that shown in FIG. 4, including a gain controlled amplifier to further increase the sensitivity of the circuit.

The sensitivity of the receiver circuitry portion of the laser speed detector shown in FIG. 4 may be further improved by the inclusion of a gain controlled amplifier 244A, shown in FIG. 5. The gain controlled amplifier 244A has one input connected to the output of the amplifier 242, and another input connected to a line from the processing circuitry 218, which provides a bias signal that controls the gain set point of amplifier 244A. The output of the gain controlled amplifier 244A is connected to the input of the filter 245. The remainder of the circuitry functions the same way as the circuit described above with respect to FIG. 4. The gain controlled amplifier 244A serves to increase the dynamic range of the receiver chain.

Although the invention has been described and illustrated with a certain degree of particularity, it is understood that the present disclosure has been made only by example, and that numerous changes in the combination and arrangement of parts can be resorted to by those skilled in the art without departing from the spirit and scope of the invention, as hereinafter claimed.

I claim:

1. A countermeasure detecting circuit for detecting countermeasures taken at a target to impede speed measurements taken with a laser speed detector, the laser speed detector operative to transmit light energy to the target and to receive light energy reflected therefrom, said countermeasure detecting circuit comprising:

light signal detecting circuitry for detecting light energy of wavelengths corresponding to wavelengths of the light energy transmitted by the laser speed detector and for generating received-light signals of values representative of levels of light energy of the selected wavelengths detected thereat;

a comparator circuit coupled to receive the received-light signals generated by said light signal detecting circuitry, said comparator circuit for comparing the values of the received-light signals with a threshold signal, said threshold signal of values representative of levels of background noise of light energy typically received by said light signal detecting circuitry, and for generating comparison signals responsive thereto, said comparison signals of values representative of times in which the light energy detected by said light signal detecting circuitry exceed levels of background noise by at least a selected amount; and control circuitry coupled to receive the comparison signals generated by said comparator circuit, said control circuitry for determining times in which the comparison signals are of values indicative of countermeasures taken at the target.

2. The countermeasure detecting circuit of claim 1 wherein said light signal detecting circuit comprises an adjustable biasing source and a photodiode, said photodiode coupled to be powered by said adjustable biasing source and operative to be of characteristics responsive to levels of light energy of the selected wavelengths detected thereat.

3. The countermeasure detecting circuit of claim 2 wherein said adjustable biasing source is coupled to said control circuitry and wherein said control circuitry is further operative to control biasing levels of the adjustable biasing source.

4. The countermeasure detecting circuit of claim 3 wherein said control circuitry selects the biasing levels of the adjustable biasing source responsive to levels of background noise such that the received-light signal levels are generated when the light energy detected by said photodiode exceed the levels of the background noise.

5. The countermeasure detecting circuit of claim 1 wherein said comparator circuit further comprises an adjustable threshold signal generator, said adjustable threshold signal generator for generating the threshold signal, and a comparator coupled to receive the threshold signal and the received-light signals, said comparator for generating the comparison signals responsive to comparisons between the values of the received-light signals and values of the threshold signal.

6. A countermeasure detecting circuit of claim 5 wherein said adjustable threshold signal generator is coupled to said control circuitry and wherein said control circuitry is further operative to control selection of the values of the threshold signal generated by said adjustable threshold signal generator.

7. The countermeasure detecting circuit of claim 6 wherein said control circuitry controls the selection of the values of the threshold signal responsive to levels of the background noise of the light energy typically received by said light signal detecting circuitry such that the comparison signals are generated when the received-light signals are off values which exceed levels of the background noise by selected amounts.

8. The countermeasure detecting circuit of claim 1 wherein the countermeasure is taken at the target comprised generation at the target of pulsed signals of amplitudes greater than levels of background noise of light energy typically received by said light signal detecting circuitry and wherein said control circuitry determines times in which the pulsed signals are detected by said light signal detecting circuitry.

9. The countermeasure detecting circuit of claim 1 wherein the countermeasure is taken at the target comprise generation at the target of generally steady-state amplitude signals of amplitudes greater than levels of background noise of light energy typically received by said light signal detecting circuitry and wherein said control circuitry determines times in which the steady-state amplitude signals are detected by said light signal detecting circuitry.

10. The countermeasure detecting circuit of claim 1 further comprising an annunciator coupled to said control circuitry, said annunciator for annunciating times in which said control circuitry determines the comparison signals are of values indicative of countermeasures taken at the target.

11. The countermeasure detecting circuit of claim 1 further comprising an input device for inputting signals representative of the background levels typically received by said light signal detecting circuitry.

12. The countermeasure detecting circuit of claim 1 wherein the levels of background noise of light energy typically received by said light signal detecting circuitry is determined during operation of the laser speed detector.

13. A laser speed detector for detecting a speed of a moving target, said laser speed detector comprising:

means for transmitting laser light pulses of selected wavelengths to the target;

means for receiving light energy of the selected wavelengths including the laser light pulses transmitted by said means for transmitting to the target and reflected therefrom;

means for determining times when light energy received by said means for receiving is indicative of countermeasures taken at the target to prevent detection of the speed thereof;

means for discriminating between said received light energy indicative of countermeasures taken at the target and said received reflected light energy of said selected wavelengths from said target when said times are determined; and means for calculating the speed of the moving target responsive to reflections of the laser light pulses detected by said means for receiving in the absence of countermeasures taken at the target during said times which otherwise would prevent the calculation of the speed thereof.

14. In a laser speed detector operative to determine a speed of a moving target by transmitting light energy of selected wavelengths to the target and receive light energy of the selected wavelengths including light energy reflected from the target, an improvement of countermeasure detecting circuit for detecting countermeasures taken at the target to impede a determination of the speed thereof, said countermeasure detecting circuitry comprising:

light signal detecting circuitry for detecting light energy of wavelengths corresponding to wavelengths oft he light energy transmitted by the laser speed detector and for generating received-light signals of values representative of levels of light energy of the selected wavelengths detected thereat;

a comparator circuit coupled to receive the received-light signals generated by said light signal detecting circuitry, said comparator circuit for comparing the values of the received-light signals with a threshold signal, said threshold signal of values representative of levels of background noise of light energy typically received by said light signal detecting circuitry, and for generating comparison signals responsive thereto, said comparison signals of values representative of times in which the light energy detected by said light signal detecting circuitry exceed levels of background noise by at least a selected amount; and control circuitry coupled to receive the comparison signals generated by said comparator circuit, said control circuitry for determining times in which the comparison signals are of values indicative of countermeasures taken at the target.

15. A method for detecting countermeasures taken at a target to impede speed measurements taken by a laser speed detector of the target by transmitting light energy to the target and detecting reflections therefrom, said method comprising the steps of:

detecting light energy of wavelengths corresponding to wavelengths of the light energy transmitted by the laser speed detector;

generating received-light signals of values representative of levels of the light energy detected during said step of detecting;

comparing the values of the received-light signals with values of a threshold signal, the threshold signal of values representative of levels of background noise of light energy typically received at the laser speed detector;

generating comparison signals responsive to comparisons during said step of comparing; and determining times in which the comparison signals are of values indicative of countermeasures taken at the target.

16. The method of claim 15 wherein the light energy detected during said step of detecting is detected by a photodiode powered by an adjustable biasing source.

17. The method of claim 16 comprising the further step of controlling biasing levels of the adjustable biasing source responsive to levels of background noise such that the received-light signals generating during said step of generating the received-light signals are generated when the light energy detected by the photodiode exceed the levels of the background noise.

18. The method of claim 15 wherein the threshold signal to which the received-light signals are compared during said step of comparing is generated by an adjustable threshold signal generator.

19. The method of claim 18 comprising the further step of adjusting the values of the threshold signals generated responsive to levels of background noise such that the comparison signals generated during said step of comparing the comparison signals are generated when the light energy detected during said step of detecting exceed the levels of the background noise.

20. A method for detecting countermeasures taken at a target to impede speed measurements taken by a laser speed detector of the target by transmitting light energy to the target and detecting reflections therefrom, said method comprising the steps of:

detecting light energy of wave lengths corresponding to wave lengths of the light energy transmitted by the laser speed detector;

generating received light signals of values representative of levels of the light energy detected during said step of detecting;

comparing the values of the received light signals with values of a primary threshold signal, the primary threshold signal representative of levels of background noise of light typically received at the laser speed detector;

generating a primary comparison signal responsive to comparisons during said step of comparing with values of said primary threshold signal;

analyzing said primary comparison signal and performing a target speed calculation and a speed reliability calculation;

indicating, for a target speed calculation having a high reliability, a speed for said target; and providing, for a target speed calculation having a low reliability, a jamming indication.

21. The method of claim 20 wherein said providing step further comprises the substeps of:

comparing the values of the received light signals with values of a secondary threshold signal, the secondary threshold signal representative of levels of background noise associated with jamming countermeasures taken at a target to impede speed measurements taken by a laser speed detector;

generating a secondary comparison signal responsive to comparisons during said step of comparing with values of said secondary threshold signal;

analyzing said secondary comparison signal and performing a target speed calculation and a speed reliability calculation;

indicating, for a target speed calculation having a high reliability, a speed for said target and a jamming indication; and providing, for a target speed calculation having a low reliability, a speed error indication, and a jamming indication.

* * * * *